United States Patent
Li (10) Patent No.: US 10,901,649 B2
(45) Date of Patent: Jan. 26, 2021

(54) STORAGE RECLAMATION FOR DISTRIBUTED STORAGE SYSTEMS

(71) Applicant: VMware, Inc., Palo Alto, CA (US)

(72) Inventor: Xin Li, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 52 days.

(21) Appl. No.: 16/254,604

(22) Filed: Jan. 23, 2019

(65) Prior Publication Data

US 2020/0233602 A1    Jul. 23, 2020

(51) Int. Cl.
    *G06F 12/00*    (2006.01)
    *G06F 3/06*     (2006.01)
    *G06F 11/10*    (2006.01)

(52) U.S. Cl.
    CPC ............ *G06F 3/0652* (2013.01); *G06F 3/067* (2013.01); *G06F 3/0608* (2013.01); *G06F 3/0644* (2013.01); *G06F 3/0664* (2013.01); *G06F 11/1076* (2013.01)

(58) Field of Classification Search
    CPC .. G06F 3/0652; G06F 3/0608; G06F 11/1076; G06F 3/067; G06F 3/0664; G06F 3/0644
    See application file for complete search history.

(56) References Cited

U.S. PATENT DOCUMENTS

| | | | |
|---|---|---|---|
| 2013/0290608 A1* | 10/2013 | Nelogal | G06F 3/0688 711/103 |
| 2016/0110111 A1* | 4/2016 | Song | G06F 3/0632 711/103 |
| 2017/0031771 A1* | 2/2017 | Binford | G06F 11/1448 |

* cited by examiner

*Primary Examiner* — Arvind Talukdar
(74) *Attorney, Agent, or Firm* — SU IP Consulting (57) ABSTRACT

Example methods and systems are provided for storage reclamation from a distributed storage system in a virtualized computing environment. The method may comprise: detecting a request to reclaim a target address range associated with the distributed storage system; and mapping the target address range to multiple data chunks. The method may also comprise: in response to identifying a fully-reclaimable stripe spanning across the multiple storage resources, reclaiming particular data chunks associated with the fully-reclaimable stripe, and parity chunk(s) associated with the fully-reclaimable stripe.

21 Claims, 6 Drawing Sheets

STORAGE RECLAMATION FOR DISTRIBUTED STORAGE SYSTEMS

BACKGROUND

Unless otherwise indicated herein, the approaches described in this section are not admitted to be prior art by inclusion in this section.

Virtualization allows the abstraction and pooling of hardware resources to support virtual machines (VMs) in a virtualized computing environment, such as a software-defined data center (SDDC). For example, through server virtualization, virtualization computing instances such as VMs running different operating systems may be supported by the same physical machine (e.g., also referred to as a "host"). Each VM is generally provisioned with virtual resources to run an operating system and applications. The virtual resources may include central processing unit (CPU) resources, memory resources, storage resources, network resources, etc. In practice, storage resources are required by a VM to store data relating to the operating system and applications run by the VM, etc. In a distributed storage system, storage resources of a cluster of hosts may be aggregated to form a single shared pool of storage. VMs supported by the hosts within the cluster may then access the pool to store data. In practice, storage reclamation may be implemented to reclaim storage space that is no longer in use. However, not all unused storage space is currently reclaimed.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to distributed storage systems will now be explained in more detail using FIG. 1, which is a schematic diagram illustrating example virtualized computing environment 100 in which storage reclamation may be performed for distributed storage system 190. It should be understood that, depending on the desired implementation, virtualized computing environment 100 may include additional and/or alternative components than that shown in FIG. 1.

Figure 1:
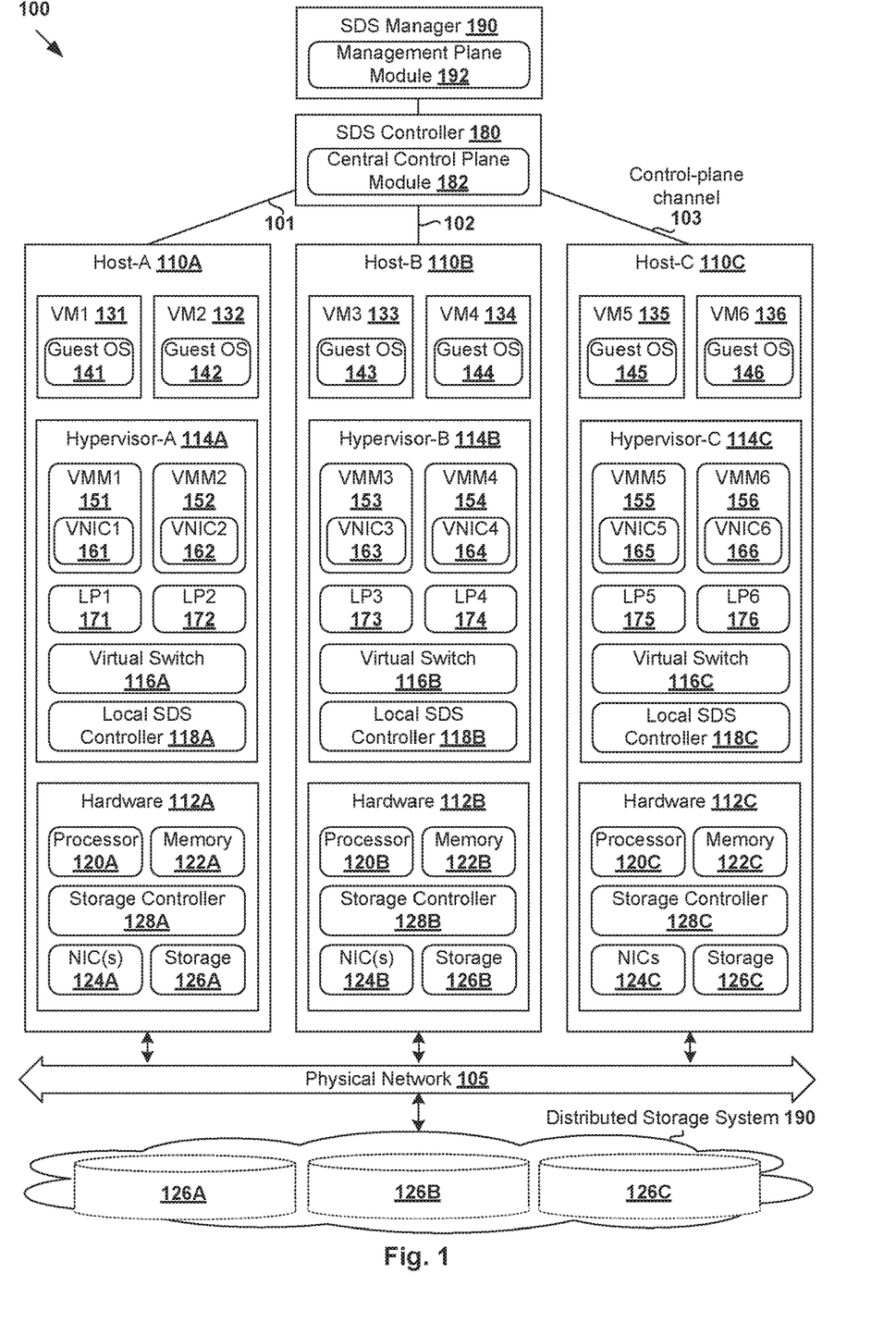
FIG. 1 is a schematic diagram illustrating an example virtualized computing environment in which storage reclamation may be performed for a distributed storage system.

In the example in FIG. 1, virtualized computing environment 100 includes a cluster of multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, virtualized computing environment 100 may include any number of hosts (also known as a "host computers", "host devices", "physical servers", "server systems", "transport nodes," etc.), where each host may be supporting tens or hundreds of VMs.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 114A/114B/114C may be implemented any suitable virtualization technology, such as VMware ESX® or ESXi™ (available from VMware, Inc.), Kernel-based Virtual Machine (KVM), etc. Hypervisor 114A/114B/114C may also be a "type 2" or hosted hypervisor that runs on top of a conventional operating system on host 110A/110B/110C.

Hypervisor 114A/114B/114C implements virtual switch 116A/116B to handle egress packets from, and ingress packets to, corresponding VMs 131-136 via respective logical ports 171-176. The term "logical port" may refer generally to a port on a logical switch to which a virtualized computing instance is connected. A "logical switch" may refer generally to a software-defined networking (SDN) construct that is collectively implemented by virtual switches 116A-C in the example in FIG. 1, whereas a "virtual switch" may refer generally to a software switch or software implementation of a physical switch. In practice, there is usually a one-to-one mapping between a logical port on a logical switch and a virtual port on virtual switch 116A/116B/116C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Hypervisor 114A/114B/114C also maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; storage resource(s) 126A/126B/126C, storage controller(s) 128A/128B/128C to provide access to storage resource(s) 126A/126B/126C, etc. Virtual resources are allocated to VMs to support respective guest operating systems (OS) 141-146, and applications (not shown for simplicity). Corresponding to hardware 112A/112B/112C, the virtual resources may include virtual CPU, guest physical memory (i.e., memory visible to the guest OS running in a VM), virtual disk, virtual network interface controller (VNIC), etc. Hardware resources may be emulated using virtual machine monitors (VMMs) 151-156, which may be considered as part of corresponding VMs 131-136, or alternatively, separated from VMs 131-136. In the example in FIG. 1, VNICs 161-166 are emulated by corresponding VMMs 151-156. Although one-to-one relationships are shown, one VM may be associated with multiple VNICs (each VNIC having its own network address).

In practice, storage controller 128A/128B/128C may be any suitable controller, such as redundant array of independent disks (RAID), etc. Each host 110A/110B/110C may include any suitable number of storage resources in the form of physical storage devices, drives or disks. Each physical storage resource may be housed in or directly attached to host 110A/110B/110C. Example physical storage resources include solid-state drives (SSDs), Universal Serial Bus (USB) flash drives, etc. For example, SSDs are gaining popularity in modern storage systems due to relatively high performance and affordability. Depending on the desired implementation, each SSD may include a high-speed interface connected to a controller chip and multiple memory elements.

To implement software-defined storage (SDS) in virtualized computing environment 100, hosts 110A-C may be configured as a cluster. This way, hosts 110A-C may aggregate their storage resources 126A-C to form distributed storage system 190 that represents a shared pool of storage resources 126A-C. Distributed storage system 190 may employ any suitable technology, such as Virtual Storage Area Network (VSAN™) available from VMware, Inc. For example, hosts 110A-C may aggregate respective storage resources 126A-C into an "object store" (also known as a datastore or a collection of datastores). The object store represents a logical aggregated volume to store any suitable VM data relating to VMs 131-136, such as virtual machine disk (VMDK) objects, snapshot objects, swap objects, home namespace objects, etc. Any suitable disk format may be used, such as VM file system leaf level (VMFS-L), VSAN on-disk file system, etc. Distributed storage system 190 is accessible by hosts 110A-C via physical network 105.

SDS controller 180 and SDS manager 190 are example network management entities that facilitate configuration and management of distributed storage system 190 in virtualized computing environment 100. In the example in FIG. 1, SDS controller 180 and SDS manager 190 support central control plane (CCP) module 182 and management plane module 192, respectively. Management entity 180/180 may be implemented using physical machine(s), VM(s), a combination thereof, etc. Users (e.g., network administrators) may access the functionalities of the SDS manager 190 and/or SDS controller 180 via any suitable interface, such as graphical user interface (GUI), command-line interface, Application Programming Interface (API) calls.

To send and receive control information (e.g., configuration information), each host 110A/110B/110C may implement local SDS controller 118A/118B/118C to interact with SDS controller 180 to perform configuration according to received control information. SDS controller 180 may establish control-plane channel 101/102/103 with host 110A/110B/110C to facilitate the interaction. Depending on the desired implementation, local SDS controller 118A/118B/118C may implement any suitable module (e.g., distributed object manager (DOM)) to manage the creation of, and access to, VM storage objects that reside on distributed storage system 190.

Example Distributed Storage System

Using a RAID configuration, for example, data may be spread over a set of storage resources on different hosts for fault tolerance purposes. In general, data may be distributed in several ways (known as RAID levels) depending on the required level of redundancy and performance. For example, RAID-0 supports data striping, but not data mirroring. RAID-1 supports data mirroring, but without parity or stripping. Other examples include RAID-2 (bit-level striping with dedicated parity), RAID-3 (byte-level striping with dedicated parity), RAID-4 (block-level striping with dedicated parity), RAID-5 (block-level striping with distributed parity), RAID-6 (block-level striping with double distributed parity), etc.

An example will be explained using FIG. 2, which is a schematic diagram illustrating example storage reclamation 200 for distributed storage system 190. In this example, a RAID-5 configuration is used for distributed storage system 190 formed by multiple (N=4) storage resources 126A-D associated with respective hosts 110A-D. Fourth storage resource 126D is supported by host-D 110D, which may include components similar to that of hosts 110A-C (explanation not repeated here for brevity). It should be understood that each "storage resource" may include any suitable number of physical disks or drives in practice. Depending on the desired implementation, multiple physical disks on each host may be organized into disk group(s).

Figure 2:
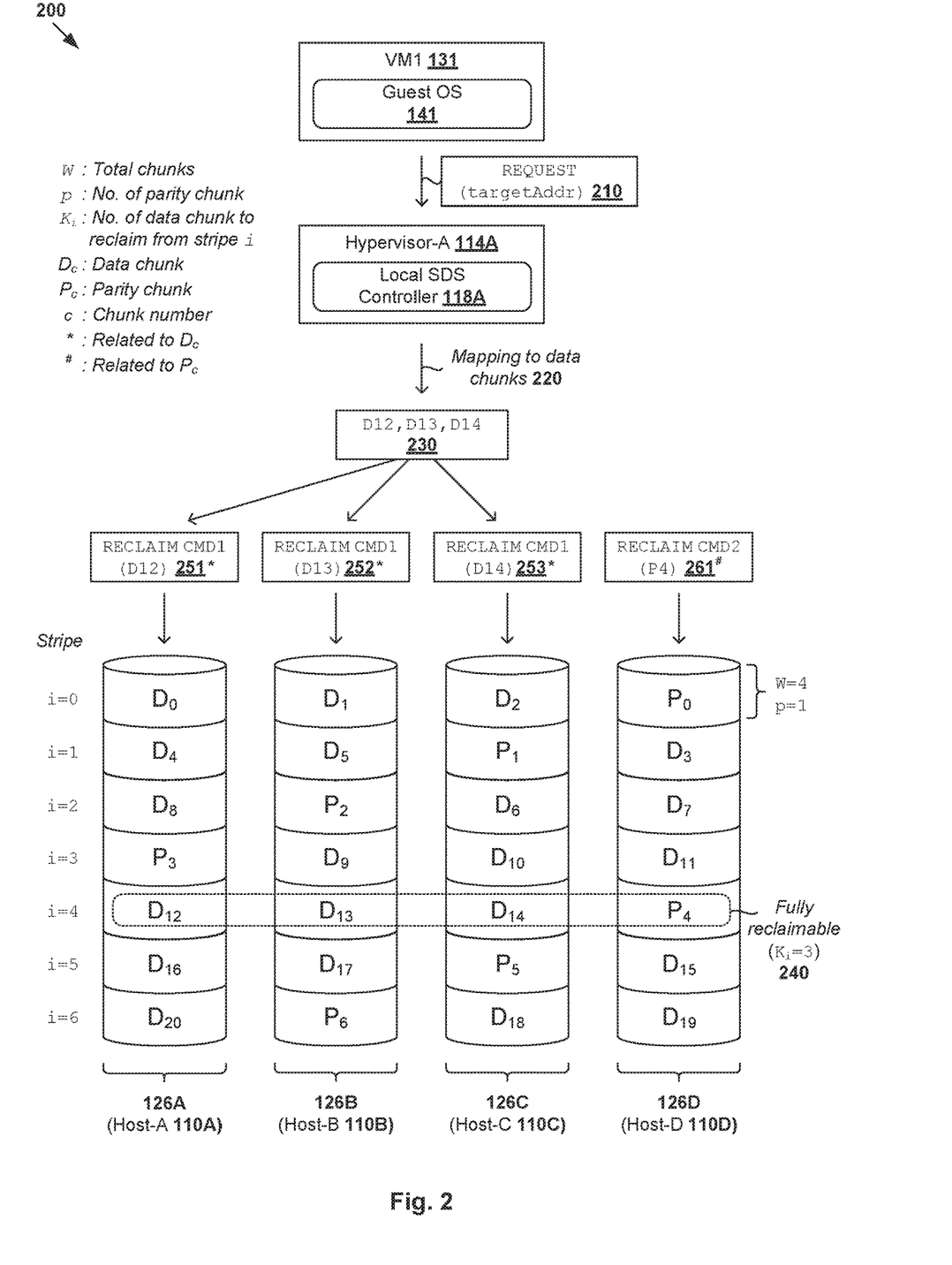
FIG. 2 is a schematic diagram illustrating an example storage reclamation for a distributed storage system.

Using a space efficiency feature (e.g., erasure coding), hosts 110A-D in FIG. 2 may be deployed to support a 3+1 configuration, i.e., three (3) data chunks and one (1) parity chunk per stripe. To survive the loss of one host (i.e., failure to tolerate (FTT)=1), the data and parity chunks are distributed across four hosts 110A-D in a cluster. Using data striping, local address ranges of storage resources 126A-D are aggregated such that data may be organized in logically continuous data portions called "stripes." The segments of sequential data written to, or read from, a storage resource are usually called "chunks" (also known as "blocks" and "stripe units"). The amount of data (e.g., in sectors) in one chunk is known as the chunk size, stripe size, stripe depth, or stripe length. In FIG. 2, seven (M=7) stripes with respective stripe indices i=0, 1, . . . , M−1 are shown. The first stripe with index i=0 includes three data chunks (see "D0," "D1" and "D2") that are spread across storage resources 126A-C supported by respective hosts 110A-C.

To improve throughput and reliability, distributed parity may be implemented by distributing parity chunks (see "P0" to "P6") over storage resources 126A-D. For a RAID-5 configuration, one (i.e., p=1) parity chunk may be stored per stripe, such as "P0" on stripe i=0, "P1" on i=1, "P2" on i=2, and so on. Any suitable parity layout may be used, such as a left-symmetric parity layout that places parity chunks on different storage resources 126A-D in a round robin manner. The first parity chunk (see "P0" for i=0) resides on storage resource 126D supported by host-D 110D. The second parity chunk (see "P1" for i=1) resides on storage resource 126C of host-C 110C, the third parity chunk (see "P2" for i=2) on storage resource 126B of host-B 110B, and so on. Using W=the total number of chunks and p=number of parity chunks, a stripe i may therefore include W−p data chunks, such as W=4, p=1 and W−p=3 for the RAID-5 configuration in FIG. 2.

In practice, the parity information in a parity chunk (e.g., "P0") may be generated by performing any suitable operation (e.g., exclusive OR (XOR), etc.) on data chunks (e.g., "D0," "D1" and "D2") from the same stripe. When one data chunk (e.g., "D2") is lost, the lost data may be rebuilt using the remaining data chunks (e.g., "D0" and "D1") and parity chunk (e.g., "P0"). By augmenting data striping with parity information, data recovery may be performed when there is a failure at a particular host (e.g., host-C 110C) that affects access to its storage resource (e.g., 126A). The failure may be power loss, data corruption, hardware failure (e.g., disk failure), software failure, etc. In practice, each stripe may have multiple parity chunks, such as in the case of RAID-6 configuration (to be described further using FIG. 6).

In the example in FIG. 2, storage reclamation may be used to "reclaim" storage space that is no longer in use in distributed storage system 190, such as when VM-related data is deleted using guest OSs 141-146 of respective VMs 131-136. Any suitable command may be used for storage reclamation. For systems using Serial Advanced Technology Attachment (SATA) interface, a TRIM command may be used to reclaim storage space whose content is obsolete. For systems using Serial Attached Small Computer Serial Interface (SCSI), an UNMAP command offers a similar functionality. In practice, there are several approaches to manage subsequent reads of reclaimed chunks: (i) non-deterministic, (ii) deterministic and (iii) deterministic read zero (DRZ). For the non-deterministic behavior, each read of a trimmed sector may return different data. For the deterministic behavior, all subsequent reads of a trimmed chunk should return the same data (which may have arbitrary values). For the DRZ behavior, all subsequent reads of a trimmed chunk should return zero-valued bytes.

Conventionally, a parity chunk (e.g., "P0") may remain unclaimed even when the parity information is no longer in use. For example, even when all corresponding data chunks (e.g., "D0," "D1" and "D2") are reclaimed, a parity chunk is generally updated instead of being reclaimed. The update may depend on the desired behavior of subsequent reads of reclaimed chunks, such as the (i) non-deterministic, (ii) deterministic and (iii) DRZ behaviors mentioned above. In the case of DRZ, parity chunks may be updated on the basis that the reclaimed chunks are zero-written. For a RAID-5 configuration, this means that about 25% (using one parity chunk per stripe) of storage space is not reclaimed. For a RAID-6 configuration, the amount is about 33% (using two parity chunks per stripe).

Storage Reclamation

According to examples of the present disclosure, storage space efficiency and utilization may be improved in distributed storage system 190 by identifying stripes that are "fully reclaimable." This way, where possible, both data and parity chunks that are no longer in use may be reclaimed. As used herein, the term "stripe" may refer generally to a sequence or row of multiple storage blocks that are logically contiguous and distributer over multiple storage resources (e.g., 126A-D) in distributed storage system 190. The term "chunk" associated with a stripe may refer generally to one of multiple storage blocks located on a particular stripe.

Figure 3:
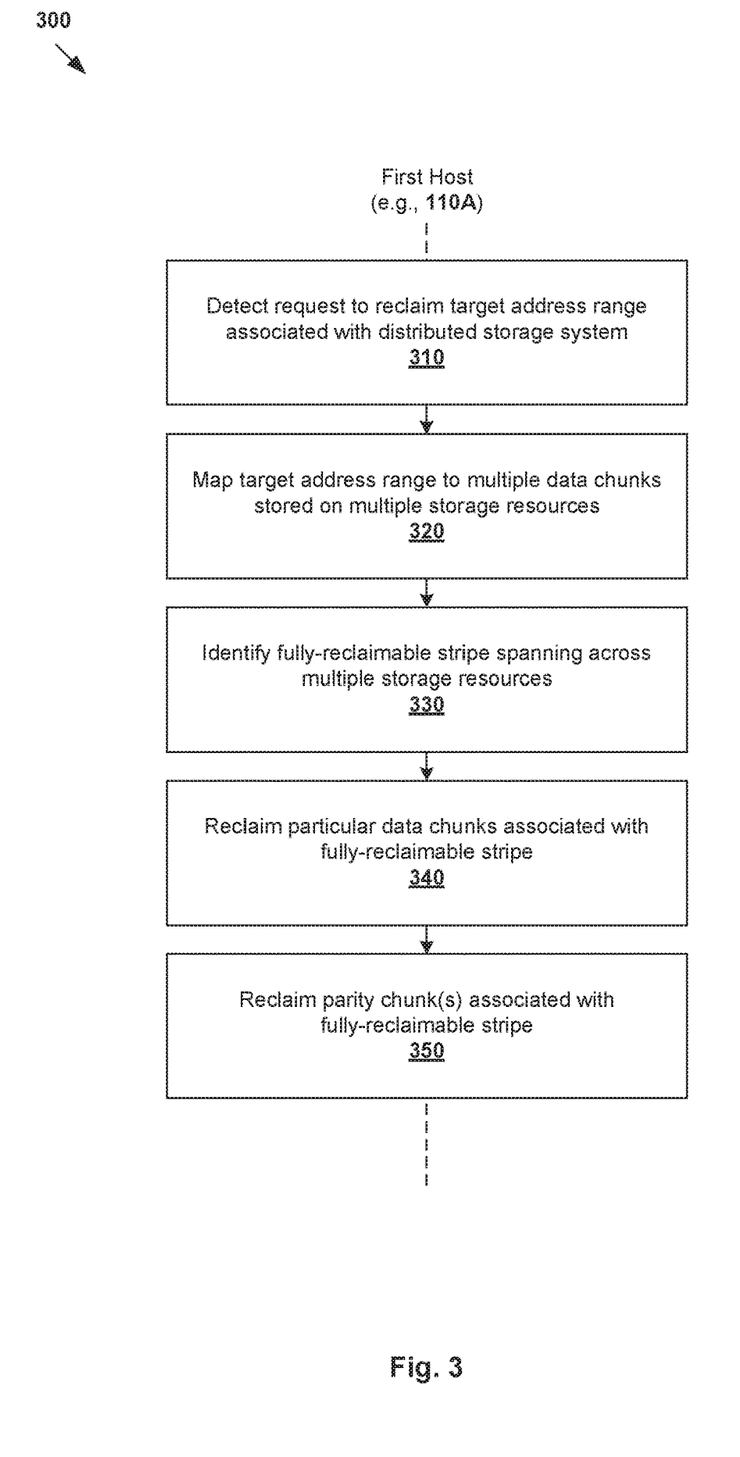
FIG. 3 is a flowchart of an example process for a first host to perform storage reclamation for a distributed storage system.

In more detail, FIG. 3 is a flowchart of example process 300 for a first host to perform storage reclamation for distributed storage system 190 in virtualized computing environment 100. Example process 300 may include one or more operations, functions, or actions illustrated by one or more blocks, such as 310 to 350. The various blocks may be combined into fewer blocks, divided into additional blocks, and/or eliminated depending on the desired implementation. In the following, various examples will be described using host-A 110A as an example "first host," and hosts 110B-D as example "second hosts." Although the terms "first" and "second" are used throughout the present disclosure to describe various elements, these elements should not be limited by these terms. These terms are used to distinguish one element from another. For example, a first element may be referred to as a second element, and vice versa. Any host may each perform the role of a "first host" or a "second host."

At 310 in FIG. 3, host-A 110A may detect a request (see 210 in FIG. 2) to reclaim a target address range associated with distributed storage system 190. In the example in FIG. 2, request 210 from VM1 131 supported by host-A 110A may be a TRIM or UNMAP command. Request 210 may be generated by guest OS 141, etc.

At 320 in FIG. 3, the target address range may be mapped to multiple data chunks that are stored on multiple storage resources 126A-D forming distributed storage system 190. In the example in FIG. 2, a target address range (targetAddr) may be mapped to data chunks labelled "D12," "D13" and "D14" respectively. "D12" is stored on first storage resource 126A of host-A 110A, "D13" on second storage resource 126B of host-B 110B and "D14" on third storage resource 126C of host-C 110C. See also 220 and 230 in FIG. 2.

At 330 and 340 in FIG. 3, in response to identifying a fully-reclaimable stripe (see 240 in FIG. 2) spanning across storage resources 126A-D, host-A 110A may reclaim particular data chunks associated with fully-reclaimable stripe 240. Here, the "particular data chunks" may form at least a subset of the data chunks identified at block 320. In the example in FIG. 2, data chunks "D12," "D13" and "D14" on fully-reclaimable stripe 240 may be reclaimed by issuing respective first reclaim commands 251-253.

As used herein, the term "fully-reclaimable stripe" at block 340 may refer generally to a stripe i whose all chunks (i.e., both data and parity chunks) may be reclaimed. Using notations W=total number of chunks and p=number of parity chunks, one example approach to identify a "fully reclaimable" stripe i is by determining whether $K_i$=W−p data chunks are reclaimable from that stripe. In the example in FIG. 2, stripe i=4 is fully reclaimable based on W=4, p=1 and $K_i$=W−p=3 (see 240). The term "partially-reclaimable stripe" may refer generally to a stripe i that includes at least one data chunk that is not reclaimed. Using the above notations, a stripe i may be "partially reclaimable" in response to determination that $K_i$<W−p data chunk(s) are reclaimable from that stripe. Any alternative and/or additional approaches to identify fully or partially reclaimable strips may be used in practice.

Figure 5:
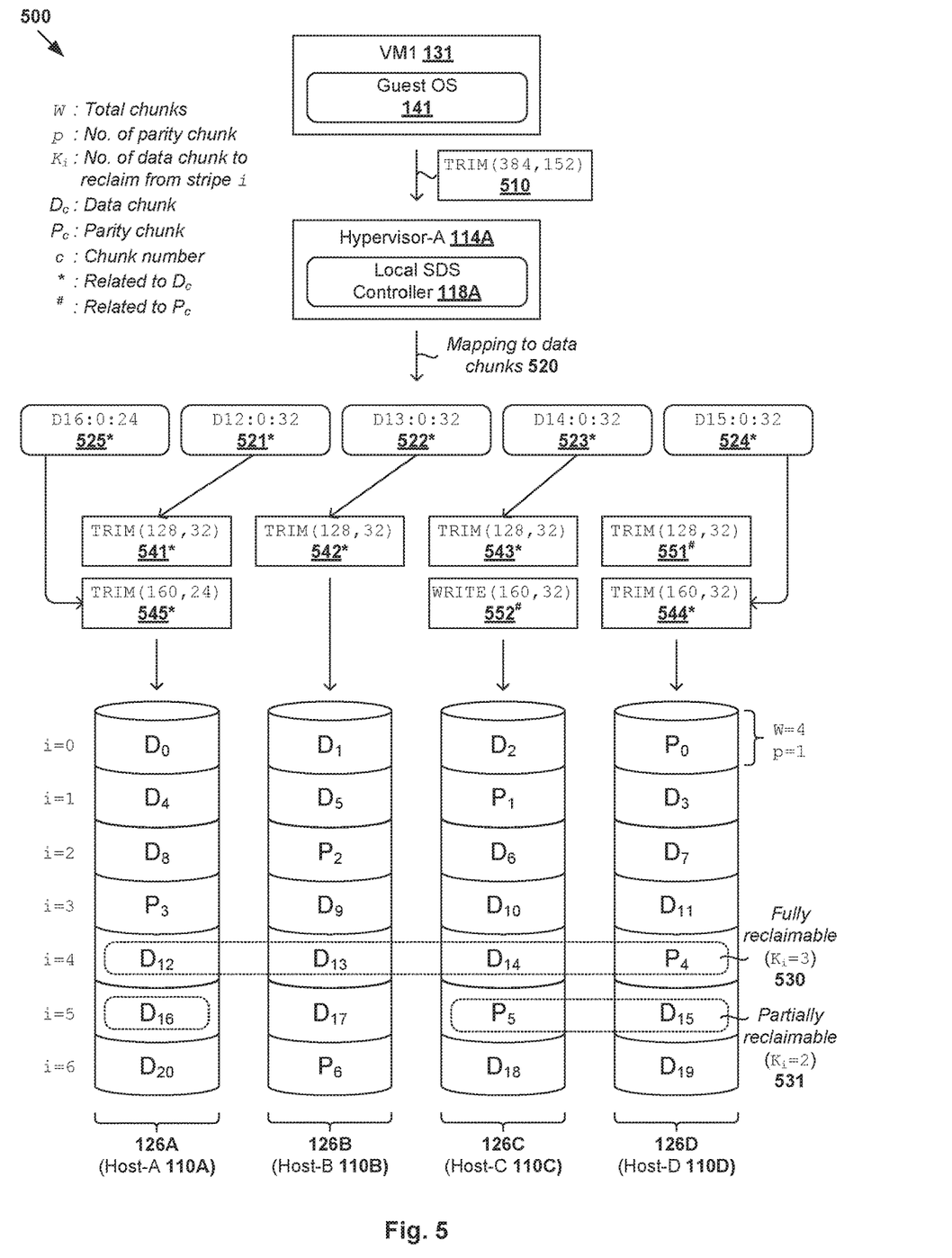
FIG. 5 is a first example of storage reclamation for a distributed storage system in a virtualized computing environment.
Figure 6:
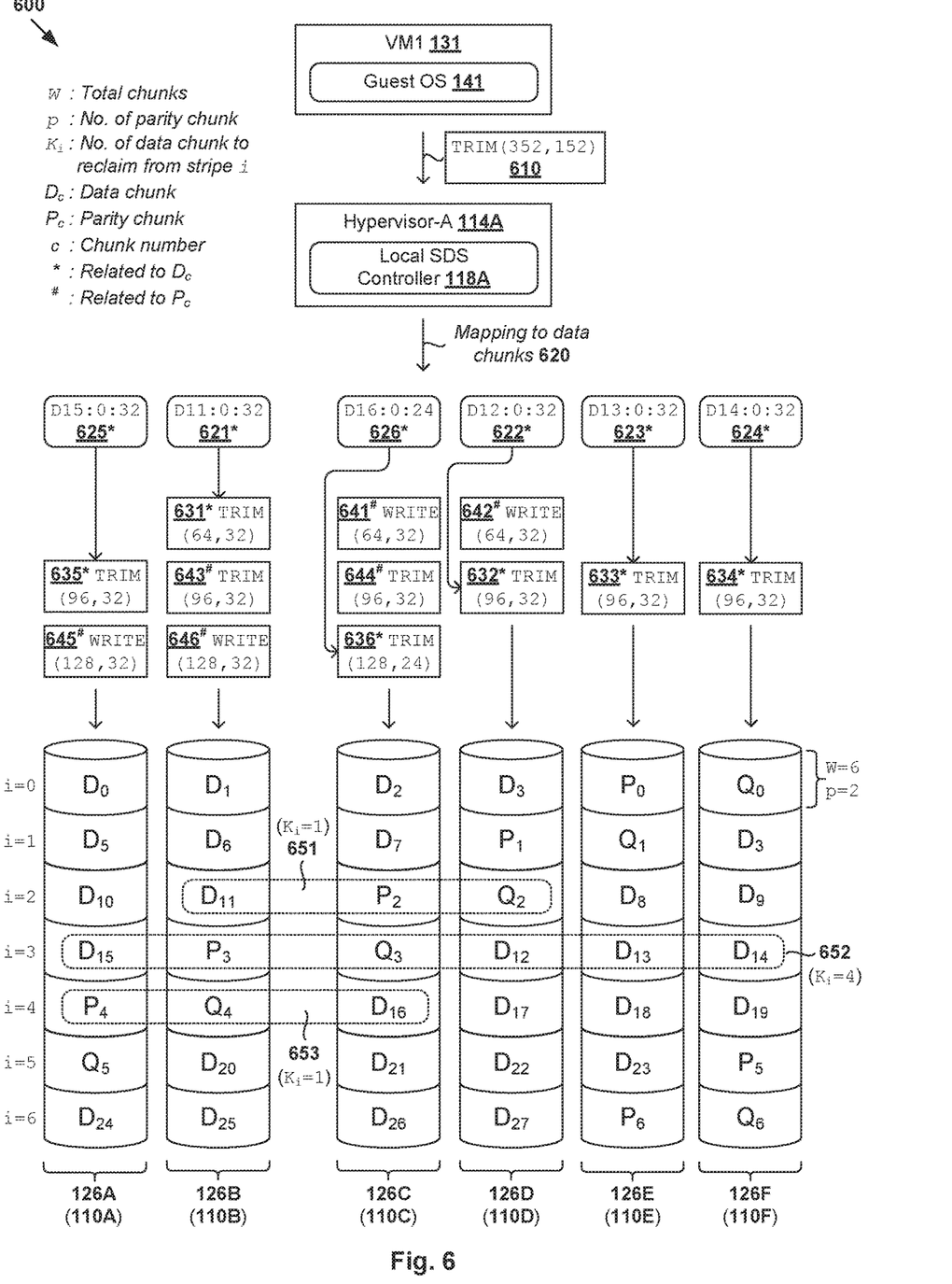
FIG. 6 is a second example of storage reclamation for a distributed storage system in a virtualized computing environment.

Further, at 350 in FIG. 3, in response to identifying fully-reclaimable stripe 240, host-A 110A may reclaim a parity chunk. In the example in FIG. 2, parity chunk "P4" is located on the same fully-reclaimable stripe 240, and configured to facilitate recovery of data chunks "D12," "D13" and "D14." Parity chunk "P4" may be reclaimed using a second reclaim command (see 261). As will be discussed using FIGS. 4-6, the "commands" at blocks 340-350 may be any suitable reclaim commands, such as TRIM (used in FIG. 5 and FIG. 6), UNMAP, etc. It should be understood that blocks 340 and 350 may be performed using a single command, or multiple commands (as shown in FIGS. 5-6) in practice.

Using examples of the present disclosure, a fully-reclaimable stripe (e.g., 240) may be identified to achieve 100% storage reclamation for that particular stripe. Once identified, both data and parity chunks located on the fully-reclaimable stripe may be reclaimed. This way, storage efficiency may be improved compared to conventional approaches that do not reclaim parity chunks at all. For a RAID-5 configuration, an additional 25% of storage space may be reclaimed for the fully-reclaimable stripe. For a RAID-6 configuration, the amount is about 33% per stripe.

As will be discussed further using FIG. 5 and FIG. 6, examples of the present disclosure may be implemented to facilitate partial storage reclamation. For example, a partially-reclaimable stripe (e.g., 531 in FIG. 5) may be identified based on multiple data chunks to be reclaimed. In this case, data chunk(s) associated with the partially-reclaimable stripe may be reclaimed, such as using third reclaim command(s). Also, the parity chunk(s) may be updated, such as using a WRITE command to facilitate the DRZ behavior discussed using FIG. 2. The "partially-reclaimable stripe" may be a leading stripe (e.g., incomplete first row) or a trailing stripe (e.g., incomplete last row). Various examples will be discussed below.

First Example (RAID-5 Configuration)

Figure 4:
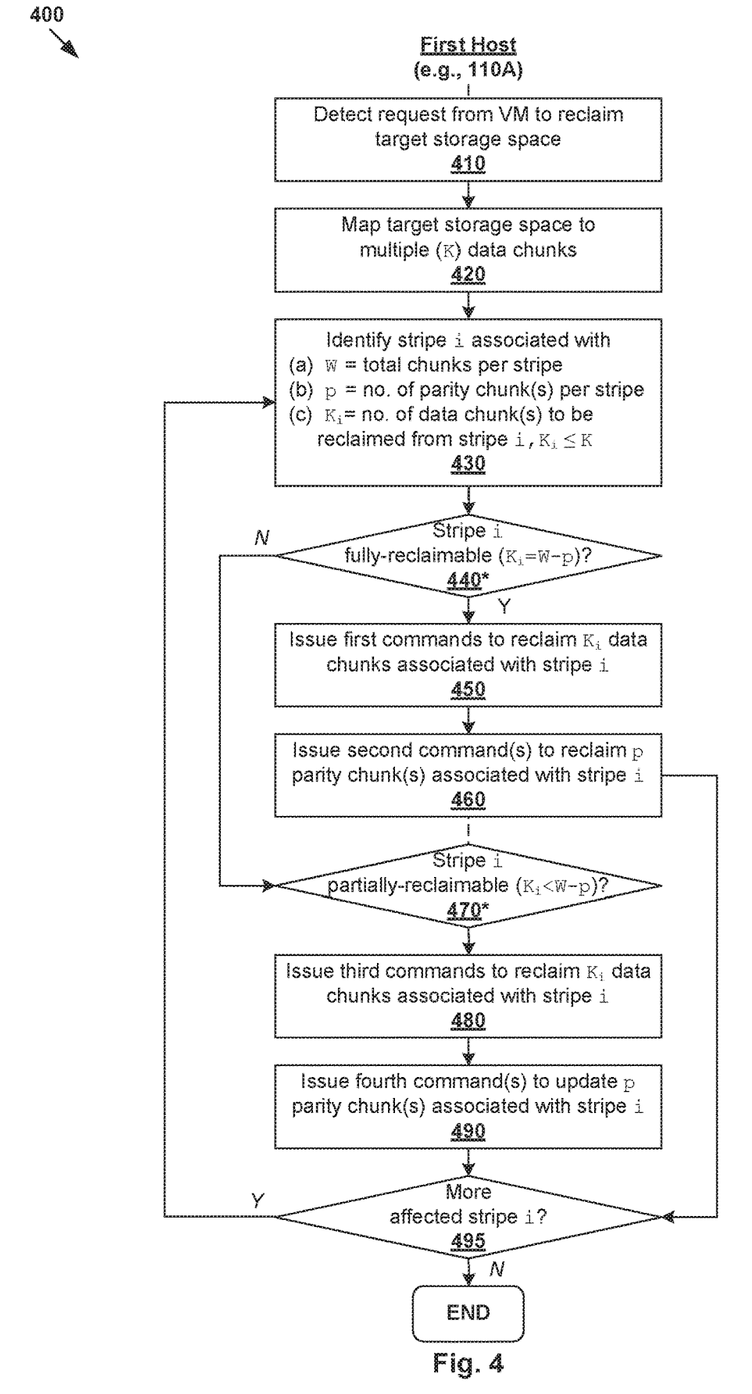
FIG. 4 is a flowchart of an example detailed process of storage reclamation for a distributed storage system in a virtualized computing environment.

FIG. 4 is a flowchart of first example detailed process 400 of storage reclamation for distributed storage system 190 in virtualized computing environment 100. Example process 400 may include one or more operations, functions, or actions illustrated by one or more blocks, such as 410 to 495. The various blocks may be combined into fewer blocks, divided into additional blocks, and/or eliminated depending on the desired implementation. The example in FIG. 4 will be explained using FIG. 5, which is a schematic diagram illustrating first example 500 of storage reclamation for distributed storage system 190 in virtualized computing environment 100. The examples below may be implemented by any suitable first host 110A/110B/110C/110D using hypervisor 114A/114B/114C/114D (e.g., 118A/118B/118C/118D), etc.

(a) Mapping

At 410 in FIG. 4, host-A 110A may detect a request (see 510 in FIG. 5) to reclaim a target address range associated with distributed storage system 190. For example, guest OS 141 associated with VM1 131 may issue the request as a notification that the content of a target address range is no longer in use, and may be garbage-collected to improve space efficiency. Request 510 may include a TRIM command, such as TRIM(l=384, s=152) in FIG. 5. Here, the "target address range" may be specified using any suitable addressing mechanism, such as logical block addressing (LBA) range, etc. The LBA range may be defined using a starting sector (e.g., l=384) and a number of sectors (e.g., s=152) that are unallocated.

At 420 in FIG. 4, in response to detecting request 510, host-A 110A maps the target address range to multiple data chunks (see 520 in FIG. 5) that will be affected by reclaim request 510. For example, the LBA range specified by TRIM(l=384, s=152) may be mapped into chunk ranges. Each chunk range may be represented as (Dc:0: size), where Dc is the chunk number, 0 is the offset or starting sector, and size is the chunk size (e.g., in sectors).

Assuming a chunk has 32 sectors (i.e., size=32), the affected data chunk ranges are: (D12:0:32), (D13:0:32), (D14:0:32), (D15:0:32) and (D16:0:24). See corresponding 521-525 in FIG. 5. Here, a total of K=5 data chunks are reclaimable. Note that data chunk "D12" resides on first storage resource 126A of host-A 110A, "D13" on second storage resource 126B of host-B 110B, "D14" on third storage resource 126C of host-C 110C, "D15" on fourth storage resource 126D of host-D 110D, and "D16" on first storage resource 126A of host-A 110A.

At 430 in FIG. 4, host-A 110A identifies stripe(s) associated with the data chunks mapped to the target address range at block 420. In particular, a first subset of $K_i=3$ data chunks (i.e., "D12" to "D14") is located on a leading stripe (i=4). A second subset of $K_i=2$ data chunks (i.e., "D15" and "D16") is located on a trailing stripe (i=5). Depending on whether a particular stripe is fully or partially reclaimable, its parity chunk may be reclaimed or updated as follows.

(b) Fully-Reclaimable Stripe (i=4)

At 440 in FIG. 4, host-A 110A identifies the leading stripe (i=4) to be a fully-reclaimable stripe (see 530 in FIG. 5). Block 440 may involve determining that all (i.e., $K_i=3$) data chunks "D12" to "D14" (see 521-523 in FIG. 5) associated with fully-reclaimable stripe 530 have to be reclaimed according to $K_i=W-p=3$ for W=4 and p=1. As such, it is possible to reclaim the parity chunk (i.e., "P4") associated with the same stripe.

At 450 in FIG. 4, first commands (see 541-543 in FIG. 5) may be issued to reclaim a first subset of data chunks (i.e., "D12," "D13" and "D14"). Referring to 541 in FIG. 5, TRIM(128, 32) command may be issued to first storage resource 126A of host-A 110A to reclaim "D12." At 542, TRIM(128, 32) may be issued to second storage resource 126B of host-B 110B to reclaim "D13." At 543, TRIM(128, 32) may be issued to third storage resource 126C of host-C 110C to reclaim "D14."

At 460 in FIG. 4, parity chunk "P4" may be identified to be associated with the first subset of data chunks (i.e., "D12," "D13" and "D14"). Referring to 551 in FIG. 5, TRIM(128, 32) command may be issued to fourth storage resource 126D of host-D 110D to reclaim "P4." This way, all data and parity chunks located on the entire stripe 530 (i.e., a complete row) may be reclaimed.

(c) Partially-Reclaimable Stripe (i=5)

At 470 in FIG. 4, host-A 110A identifies the trailing stripe (i=5) to be partially reclaimable (see 531 in FIG. 5). Block 470 may involve determining whether all data chunks of a particular stripe 531 have to be reclaimed. In the example in FIG. 5, $K_i=2$ data chunks "D15" and "D16" (see 524-525 in FIG. 5) have to be reclaimed, but not "D17." As such, based on $K_i=2<(W-p=3)$ for W=4 and p=1, it is not possible to reclaim the parity chunk (i.e., "P4") from the same stripe.

At 480 in FIG. 4, third commands (see 544-545 in FIG. 5) may be issued to reclaim a second subset of data chunks (i.e., "D15" and "D16"). Referring to 544 in FIG. 5, TRIM (160, 32) may be issued to fourth storage resource 126D of host-D 110D to reclaim data chunk "D15." At 545, TRIM (160, 24) may be issued to first storage resource 126A of host-A 110A to reclaim data chunk "D16." Depending on the desired implementation, it should be understood that the reclaim commands in blocks 450, 460 and 480 may be separate commands (as shown in FIG. 5), or a single command if supported by the underlying system.

At 490 in FIG. 4, parity chunk "P5" may be identified to be associated with the second subset of data chunks (i.e., "D15" and "D16"). Referring to 552 in FIG. 5, a WRITE command may be issued to fourth storage resource 126D of host-D 110D to update parity chunk "P5." The WRITE command may be configured based on a desired behavior of subsequent reads of the reclaimed data chunks "D15" and "D16." As discussed using FIG. 2, the desired behavior may be (i) non-deterministic, (ii) deterministic and (iii) DRZ.

To facilitate the DRZ behavior, all subsequent reads of reclaimed data chunks "D15" and "D16" should return zero-valued bytes. In this case, WRITE(160, 32) may be issued to update parity chunk "P5" as if data chunks "D15" and "D16" is zero-written. For example, a particular value in the parity chunk "P5" may be calculated by applying an XOR operation of a corresponding value in data chunks "D15" (set to zero), "D16" (set to zero) and "D17." The WRITE command for updating parity chunk "P5" (see 552) should be contrasted against the TRIM command for reclaiming "P4" (see 551). The above may be repeated until all affected stripes are considered (see 495 in FIG. 4).

Second Example (RAID-6 Configuration)

FIG. 6 is schematic diagram illustrating second example 600 of storage reclamation for distributed storage system 190 in virtualized computing environment 100. For the RAID-6 configuration with erasure coding in FIG. 6, six hosts 110A-F may be used to support a 4+2 configuration, i.e., four (4) data chunks labelled "D" and two (2) parity chunks labelled "P" and "Q" respectively per stripe. The configuration is designed to survive the loss of two hosts simultaneously (FTT=2). Once again, using notations W=the total number of chunks and p=number of parity chunks, a stripe i may include (W−p)=4 data chunks for W=6 and p=2 in the RAID-6 configuration in FIG. 6. The examples below may be implemented according to the example in FIG. 4 using any suitable first host (i.e., any of hosts 110A-F), etc.

(a) Mapping

According to 410 and 420 in FIG. 4, in response to detecting a reclaim request (see 610 in FIG. 6), host-A 110A maps the request to multiple (K=6) data chunks to be reclaimed (see 620 in FIG. 6). Assuming a chunk has 32 sectors, the target address range (e.g., LBA range) specified by TRIM(352, 184) may be mapped to the following chunk ranges: (D11:0:32), (D12:0:32), (D13:0:32), (D14:0:32), (D15:0:32) and (D16:0:24). Note that the total number of sectors to be reclaimed is 184 (i.e., 5×32+24). See corresponding 621-626 in FIG. 6.

Due to data striping and distributed parity, data chunk "D11" resides on second storage resource 126B of host-B 110B, "D12" on fourth storage resource 126D of host-D 110D, "D13" on fifth storage resource 126E of host-E 110E, "D14" on sixth storage resource 126F of host-F 110F, "D15" on first storage resource 126A of host-A 110A, and "D16" resides on third storage resource 126C of host-C 110C.

According to 430 in FIG. 4, host-A 110A identifies three stripes (see 651-653 in FIG. 6) that are associated with the data chunks to be reclaimed. In particular, $K_i$=1 data chunk (i.e., "D11") is associated with a leading stripe (i=2). $K_i$=4 data chunks (i.e., "D12" to "D15") are associated with a middle stripe (i=3), and $K_i$=1 data chunk (i.e., "D16") with a trailing stripe (i=4). Depending on whether a particular stripe is fully or partially reclaimable, its parity chunks may be reclaimed or updated as follows.

(b) Partially-Reclaimable Stripe (i=2)

According to 470, 480 and 490 in FIG. 4, host-A 110A identifies the leading stripe (i=2) to be partially reclaimable (see 651 in FIG. 6) based on (W−p)=4 and $K_i$=1<(W−p). To reclaim data chunk "D11," TRIM(64, 32) may be issued to host-B 110B. Since other data chunks (i.e., "D8" to "D10") located on the same stripe are not reclaimed, it is not possible to reclaim parity chunks "P2" and "Q2." Instead, WRITE(64, 32) commands may be issued to respective host-C 110C and host-D 110D to update the respective parity chunks, such as to facilitate DRZ. See corresponding commands at 631, 641 and 642 in FIG. 6.

(c) Fully-Reclaimable Stripe (i=3)

According to 440 in FIG. 4, host-A 110A identifies the middle stripe (i=3) to be fully reclaimable (see 652 in FIG. 6) based on $K_i$=(W−p)=4. According to 450, commands (see 632-635 in FIG. 6) may be issued to reclaim respective data chunks "D12" to "D15." In particular, various TRIM(96, 32) commands may be issued to respective host-D 110D to reclaim data chunk "D12" (see 632); host-E 110E to reclaim "D13" (see 633); host-F 110F to reclaim "D14" (see 634); and host-A 110A to reclaim "D15" (see 635).

According to 460 in FIG. 4, it is possible to reclaim parity chunks "P5" and "Q5" associated with data chunks "D12" to "D15" from the same stripe 652 (i=3). TRIM(96, 32) commands may be issued to respective host-B 110B to reclaim "P5" (see 643); and host-C 110C to reclaim "Q5" (see 644). This way, all data and parity chunks associated with fully-reclaimable stripe 652 (i.e., a complete row) may be reclaimed.

(d) Partially-Reclaimable Stripe (i=4)

According to 470, 480 and 490 in FIG. 4, host-A 110A identifies the trailing stripe (i=4) to be partially reclaimable (see 653 in FIG. 6) based on (W−p)=4 and $K_i$=1<(W−p). To reclaim data chunk "D16," TRIM(128, 24) may be issued to host-C 110C. Since other data chunks (i.e., "D17" to "D19") located on the same stripe are not reclaimed, it is not possible to reclaim parity chunks "P4" and "Q4." Instead, WRITE(128, 32) commands (see 645-646) may be issued to respective host-A 110A and host-B 110B to update the respective parity chunks.

Although exemplified using RAID-5 and RAID-6, it should be understood that examples of the present disclosure may be implemented for distributed storage system 190 any suitable number of parity chunks per stripe. For example, to further improve data reliability, each stripe may include more than two parity chunks. Regardless of the number of parity chunks, full reclamation may be performed when all corresponding data chunks located on the same stripe are reclaimed.

Container Implementation

Although explained using VMs (e.g., 131-136), it should be understood that virtualized computing environment 100 may include other virtual workloads, such as containers, etc. As used herein, the term "container" (also known as "container instance") is used generally to describe an application that is encapsulated with all its dependencies (e.g., binaries, libraries, etc.). In the example in FIG. 1, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110A/110B/110C/110D or management entity 180/190 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a first host to perform storage reclamation for a distributed storage system in a virtualized computing environment that includes the first host and multiple second hosts, wherein the method comprises:
   detecting a request to reclaim a target address range associated with the distributed storage system;
   mapping the target address range to multiple data chunks that are stored on multiple storage resources forming the distributed storage system, wherein the multiple storage resources are supported by the respective first host and multiple second hosts; and
   in response to identifying a fully-reclaimable stripe spanning across the multiple storage resources based on a difference between a total number of chunks associated with the fully-reclaimable stripe and a number of parity chunks associated with the fully-reclaimable stripe,
      reclaiming particular data chunks associated with the fully-reclaimable stripe, wherein the particular data chunks form at least a subset of the multiple data chunks; and
      reclaiming respective one or more parity chunks associated with the fully-reclaimable stripe.

2. The method of claim 1, wherein the method further comprises:
   identifying, based on the multiple data chunks to be reclaimed, a partially-reclaimable stripe spanning across one or more of the multiple storage resources.

3. The method of claim 2, wherein the method further comprises:
   in response to identifying the partially-reclaimable stripe, reclaiming a second subset of the multiple data chunks, wherein each data chunk in the second subset is associated with the partially-reclaimable stripe.

4. The method of claim 2, wherein the method further comprises:
   in response to identifying the partially-reclaimable stripe, updating respective one or more parity chunks that are associated with the partially-reclaimable stripe.

5. The method of claim 4, wherein updating the respective one or more parity chunks associated with the partially-reclaimable stripe further comprises:
   issuing a WRITE command to update a particular parity chunk associated with the partially-reclaimable stripe to facilitate a deterministic read zero (DRZ) behaviour.

6. The method of claim 1, wherein identifying the fully-reclaimable stripe further comprises:
   identifying multiple stripes on which the multiple data chunks to be reclaimed are located, wherein the multiple stripes include the fully-reclaimable stripe and at least one of the following: a leading partially-reclaimable stripe and a trailing partially-reclaimable stripe.

7. The method of claim 1, wherein detecting the request further comprises:
   detecting, from a virtualized computing instance supported by the first host, the request in the form of a TRIM or UNMAP command specifying the target address range associated with the distributed storage system.

8. A non-transitory computer-readable storage medium that includes a set of instructions which, in response to execution by a processor of a computer system, cause the processor to perform a method of storage reclamation for a distributed storage system in a virtualized computing environment, wherein the method comprises:
  detecting a request to reclaim a target address range associated with the distributed storage system;
  mapping the target address range to multiple data chunks that are stored on multiple storage resources forming the distributed storage system; and
  in response to identifying a fully-reclaimable stripe spanning across the multiple storage resources based on a difference between a total number of chunks associated with the fully-reclaimable stripe and a number of parity chunks associated with the fully-reclaimable stripe,
    reclaiming the particular data chunks associated with the fully-reclaimable stripe, wherein the particular data chunks form at least a subset of the multiple data chunks; and
    reclaiming respective one or more parity chunks associated with the fully-reclaimable stripe.

9. The non-transitory computer-readable storage medium of claim 8, wherein the method further comprises:
  identifying, based on the multiple data chunks to be reclaimed, a partially-reclaimable stripe spanning across one or more of the multiple storage resources.

10. The non-transitory computer-readable storage medium of claim 9, wherein the method further comprises:
  in response to identifying the partially-reclaimable stripe, reclaiming a second subset of the multiple data chunks, wherein each data chunk in the second subset is associated with the partially-reclaimable stripe.

11. The non-transitory computer-readable storage medium of claim 9, wherein the method further comprises:
  in response to identifying the partially-reclaimable stripe, updating respective one or more parity chunks that are associated with the partially-reclaimable stripe.

12. The non-transitory computer-readable storage medium of claim 11, wherein updating the respective one or more parity chunks associated with the partially-reclaimable stripe further comprises:
  issuing a WRITE command to update a particular parity chunk associated with the partially-reclaimable stripe to facilitate a deterministic read zero (DRZ) behaviour.

13. The non-transitory computer-readable storage medium of claim 8, wherein identifying the fully-reclaimable stripe further comprises:
  identifying multiple stripes on which the multiple data chunks to be reclaimed are located, wherein the multiple stripes include the fully-reclaimable stripe and at least one of the following: a leading partially-reclaimable stripe and a trailing partially-reclaimable stripe.

14. The non-transitory computer-readable storage medium of claim 8, wherein detecting the request further comprises:
  detecting, from a virtualized computing instance, the request in the form of a TRIM or UNMAP command specifying the target address range associated with the distributed storage system.

15. A first computer system, comprising:
  a processor;
  a first storage resource from multiple storage resources forming a distributed storage system; and
  a non-transitory computer-readable medium having stored thereon instructions that, when executed by the processor, cause the processor to:
  detect a request to reclaim a target address range associated with the distributed storage system;
  map the target address range to multiple data chunks that are stored on the multiple storage resources forming the distributed storage system; and
  in response to identifying a fully-reclaimable stripe spanning across the multiple storage resources based on a difference between a total number of chunks associated with the fully-reclaimable stripe and a number of parity chunks associated with the fully-reclaimable stripe,
    reclaim the particular data chunks associated with the fully-reclaimable stripe, wherein the particular data chunks form at least a subset of the multiple data chunks; and
    reclaim respective one or more parity chunks associated with the fully-reclaimable stripe.

16. The computer system of claim 15, wherein the instructions further cause the processor to:
  identify, based on the multiple data chunks to be reclaimed, a partially-reclaimable stripe spanning across one or more of the multiple storage resources.

17. The computer system of claim 16, wherein the instructions further cause the processor to:
  in response to identifying the partially-reclaimable stripe, reclaim a second subset of the multiple data chunks, wherein each data chunk in the second subset is associated with the partially-reclaimable stripe.

18. The computer system of claim 16, wherein the instructions further cause the processor to:
  in response to identifying the partially-reclaimable stripe, update respective one or more parity chunks that are associated with the partially-reclaimable stripe.

19. The computer system of claim 18, wherein the instructions for updating the respective one or more parity chunks associated with the partially-reclaimable stripe further cause the processor to:
  issue a WRITE command to update a particular parity chunk associated with the partially-reclaimable stripe to facilitate a deterministic read zero (DRZ) behaviour.

20. The computer system of claim 15, wherein the instructions for identifying the fully-reclaimable stripe further cause the processor to:
  identify multiple stripes on which the multiple data chunks to be reclaimed are located, wherein the multiple stripes include the fully-reclaimable stripe and at least one of the following: a leading partially-reclaimable stripe and a trailing partially-reclaimable stripe.

21. The computer system of claim 15, wherein the instructions for detecting the request further cause the processor to:
  detect, from a virtualized computing instance, the request in the form of a TRIM or UNMAP command specifying the target address range associated with the distributed storage system.

* * * * *